United States Patent
Gabryjelski

(10) Patent No.: US 10,466,888 B2
(45) Date of Patent: Nov. 5, 2019

(54) SCROLLBAR FOR DYNAMIC CONTENT

(71) Applicant: Microsoft Technology Licensing, LLC, Redmond, WA (US)

(72) Inventor: Henry Gabryjelski, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 120 days.

(21) Appl. No.: 15/855,981

(22) Filed: Dec. 27, 2017

(65) Prior Publication Data
US 2018/0173412 A1 Jun. 21, 2018

Related U.S. Application Data

(63) Continuation of application No. 14/570,985, filed on Dec. 15, 2014, now Pat. No. 9,886,181.

(51) Int. Cl.
*G06F 3/0484* (2013.01)
*G06F 3/0485* (2013.01)

(52) U.S. Cl.
CPC ...... *G06F 3/04855* (2013.01); *G06F 3/04842* (2013.01)

(58) Field of Classification Search
CPC .................................................. G06F 3/04842
USPC ............................................................ 715/786
See application file for complete search history.

(56) References Cited

U.S. PATENT DOCUMENTS

| | | |
|---|---|---|
| 6,157,381 A | 12/2000 | Bates et al. |
| 7,263,380 B2 | 8/2007 | Foxenland |
| 7,873,913 B2 | 1/2011 | Lian et al. |
| 7,930,646 B2 | 4/2011 | De Souza Sana et al. |
| 8,205,168 B1 | 6/2012 | Van Slembrouck |
| 8,381,121 B2 | 2/2013 | Gupta et al. |
| 8,595,643 B2 | 11/2013 | Horagai |
| 8,624,933 B2 | 1/2014 | Marr et al. |
| 8,677,283 B2 | 3/2014 | Fong |
| 8,711,185 B2 | 4/2014 | Paek et al. |
| 8,738,092 B2 | 5/2014 | Brinda et al. |
| 8,751,956 B2 | 6/2014 | Wilairat |
| 8,812,977 B2 | 8/2014 | Naderi |
| 8,812,985 B2 | 8/2014 | Akella |

(Continued)

FOREIGN PATENT DOCUMENTS

| | | |
|---|---|---|
| KR | 20140046119 | 4/2014 |
| WO | WO-2014068340 | 5/2014 |

OTHER PUBLICATIONS

"Final Office Action", U.S. Appl. No. 14/570,985, dated Jul. 6, 2017, 21 pages.

(Continued)

*Primary Examiner* — William D Titcomb

(57) ABSTRACT

Techniques and apparatuses for a scrollbar for dynamic content are described herein. In one or more implementations, a portion of initial content is displayed in a user interface along with a scrollbar configured for selection to navigate to other portions of the initial content. While the scrollbar is selected, dynamic content for display in the user interface is detected. In response, a dynamic scroll mode for the scrollbar is activated to enable navigation to the initial content and the dynamic content. The dynamic scroll mode dynamically adjusts one or more scroll ratios of the scrollbar without changing a visual position of the scrollbar's thumb.

20 Claims, 10 Drawing Sheets

(56) References Cited

U.S. PATENT DOCUMENTS

| | | |
|---|---|---|
| 8,887,085 B1 | 11/2014 | Cox et al. |
| 9,317,188 B2 | 4/2016 | Gregotski et al. |
| 9,377,933 B2 | 6/2016 | DiPersia et al. |
| 9,886,181 B2 * | 2/2018 | Gabryjelski ........ G06F 3/04855 |
| 2004/0046795 A1 | 3/2004 | Josephson et al. |
| 2005/0097474 A1 | 5/2005 | Accot |
| 2008/0155463 A1 | 6/2008 | Lian et al. |
| 2008/0168386 A1 | 7/2008 | Brinda et al. |
| 2009/0070707 A1 | 3/2009 | Schaller et al. |
| 2010/0131886 A1 | 5/2010 | Gannon et al. |
| 2010/0134425 A1 | 6/2010 | Storrusten |
| 2010/0269038 A1 | 10/2010 | Tsuda |
| 2011/0074699 A1 | 3/2011 | Marr et al. |
| 2012/0159393 A1 | 6/2012 | Sethi |
| 2013/0014051 A1 | 1/2013 | Lefor et al. |
| 2013/0219263 A1 | 8/2013 | Abrahami |
| 2013/0265266 A1 | 10/2013 | Brinda et al. |
| 2013/0311939 A1 | 11/2013 | Hsu et al. |
| 2014/0009490 A1 | 1/2014 | Gärdenfors |
| 2014/0032481 A1 | 1/2014 | Lang |
| 2014/0033099 A1 | 1/2014 | Treitman et al. |
| 2014/0289614 A1 | 9/2014 | Ayers |
| 2015/0135133 A1 | 5/2015 | Munoz-Bustamante |
| 2016/0170629 A1 | 6/2016 | Gabryjelski |

OTHER PUBLICATIONS

"International Preliminary Report on Patentability", Application No. PCT/US2015/065423, dated Feb. 9, 2017, 10 pages.

"International Search Report and Written Opinion", Application No. PCT/US2015/065423, dated Mar. 31, 2016, 15 pages.

"Non-Final Office Action", U.S. Appl. No. 14/570,985, dated Feb. 22, 2017, 18 pages.

"Notice of Allowance", U.S. Appl. No. 14/570,985, dated Sep. 27, 2017, 8 pages.

"Scrollbar-Track-Color Property", Retrieved From: <http://msdn.microsoft.com/en-in/library/ie/ms531160%28v=vs.85%29.aspx> Sep. 26, 2014, 2 pages.

"Second Written Opinion", Application No. PCT/US2015/065423, dated Nov. 3, 2016, 9 pages.

* cited by examiner

SCROLLBAR FOR DYNAMIC CONTENT

RELATED APPLICATION

This application is a continuation of and claims priority to U.S. patent application Ser. No. 14/570,985, filed Dec. 15, 2014, entitled "Scrollbar for Dynamic Content", the entire disclosure of which is hereby incorporated by reference herein in its entirety.

BACKGROUND

A conventional scrollbar includes a thumb which can be dragged along a track to jump to specific locations in a document (e.g., a web page), for example, to provide a visual indication to a user of a current position within the document. For example, if the thumb is halfway down a scrollbar's track, it tends to indicate that the user is halfway through the content of the document. The design of conventional scrollbars is suitable for documents which contain static content, such as a predetermined page length, a predetermined number of items to be displayed, and so forth.

However, many documents today, such as web pages, dynamically update content to be displayed as the user manipulates the scrollbar, such as adding additional items when the user nears or reaches the end of currently available content. In response to receiving dynamic content, many conventional scrollbars force the position of the scrollbar's thumb to jump while the user is dragging the scrollbar thumb. Other conventional scrollbars prevent navigation to the newly added dynamic content until the thumb is released (which immediately causes the thumb's position to jump). When a mouse pointer is being used to manipulate the scrollbar, this erratic jumping of the thumb may reduce the efficiency of the user's ability to scroll, as the relative positions of the mouse pointer and thumb are jumping erratically. Similarly, the erratic jumps may cause the user to lose their place within the web page. When a user's finger is being used to manipulate the scrollbar on a touch device, this can result in erratic behavior because the user's finger remains in the original location of the thumb, which can result in large "jumps" in the displayed content when the next touch result is processed. As such, using conventional scrollbars to navigate documents with dynamically expanding content can be confusing and frustrating to users.

SUMMARY

Techniques and apparatuses for a scrollbar for dynamic content are described herein. In one or more implementations, a portion of initial content is displayed in a user interface along with a scrollbar configured for selection to navigate to other portions of the initial content. While a scrollbar is selected, dynamic content for display in the user interface is detected. In response, a dynamic scroll mode for the scrollbar is activated to enable navigation to the initial content and the dynamic content. The dynamic scroll mode dynamically adjusts one or more scroll ratios of the scrollbar without substantially changing a visual position of the scrollbar's thumb.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. The same numbers are used throughout the drawings to reference like features and components.

DETAILED DESCRIPTION

Overview

Figure 1A:
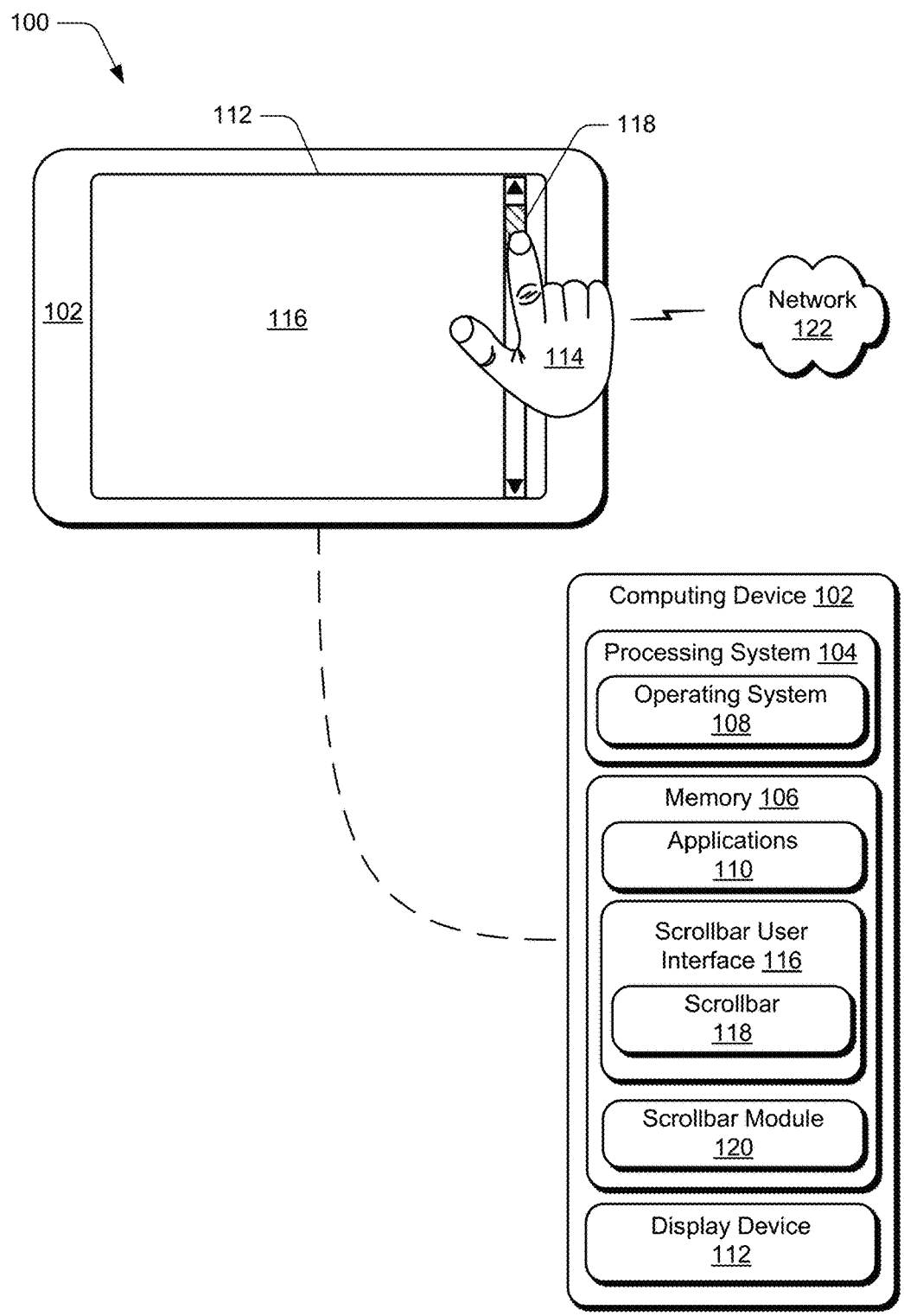
FIG. 1a is an illustration of an environment in an example implementation that is operable to support techniques described herein.

Conventional scrollbar user interfaces maintain a linear relationship between the position of the scrollbar and the position of content displayed in the user interface. For example, if the scrollbar is halfway down the user interface, it tends to indicate that the user is halfway through the content. This design is suitable for documents which contain static content, such as a predetermined page length, a predetermined number of items to be displayed, and so forth.

However, many documents today, such as web pages, dynamically update content to be displayed as the user manipulates the scrollbar to scroll down through the content. For example, a social network site, such as Facebook.com, may display a list of news items for a user in a "newsfeed", where each news item corresponds to a story or event associated with one of the user's friends. A user's newsfeed may include thousands of news items which accumulate over multiple days. Loading each news item in the user's newsfeed into a social network user interface for display is time consuming due to the large number of news feed items.

Thus, documents with a large amount of content may load only a portion of the content initially. If the user scrolls down to the end of the initial content, additional content may be dynamically added to enable the user to continue to scroll through the additional content. However, the additional content alters the linear relationship between the position of the scrollbar and the position of content displayed in the user interface.

As an example, consider that 100 news items for a social network site are initially loaded into a web browser for display. The web browser configures the scrollbar for the initial content, such that scrolling to the bottom will cause the 100th item to be displayed. As the user manipulates the scrollbar to scroll down to the bottom of the 100 news items, the social network site may load an additional 100 news items for display. At this point, the position of the scrollbar's thumb is near the bottom of the scrollbar's track, yet there are now approximately 100 news items above the currently displayed news items, and 100 items below. Thus, if the direct linear relationship were maintained, the scrollbar's thumb should now be positioned approximately in the middle of the scrollbar's track, instead of near the bottom.

Conventional scrollbars handle dynamically added content in a variety of different ways. Some conventional solutions cause the scrollbar's thumb to jump to maintain the linear relationship with the dynamically added content. For instance, in the example above, the scrollbar's thumb can be forced to jump from the bottom of the scrollbar's track to the middle of the scrollbar's track. When a mouse pointer is being used to manipulate the scrollbar's thumb, this may cause the relative positions of the mouse pointer and scrollbar thumb to jump erratically, and may cause the user to lose their place within the web page. For example, the user may have memorized a prior position as showing a specific interesting item, but be unable to easily scroll back to that location due to the new ratio applied after additional dynamic content was added. Similarly, when a user's finger is being used to manipulate the scrollbar on a touch device, this can result in erratic behavior because the user's finger remains in the original location of the scrollbar, which can result in large "jumps" in the displayed content when the next user touch result is processed.

Alternately, some conventional solutions force the displayed content to jump to a position that is proportional to the position of the thumb within the track. In the example above, since the thumb is near the bottom of the track, the web page may jump to display the last news items of the newly added content. Thus, this solution may result in unexpectedly large jumps in the displayed content.

Still other conventional solutions may simply avoid updates to the content while the scrollbar is selected and being manipulated. Then, when the scrollbar is released, the scrollbar's position may visually "jump" a significant distance, which may cause the user to lose their place within the document.

Techniques described herein, however, enable a dynamic, temporary change from a linear relationship between the scrollbar thumb's location and content location, to a non-linear relationship. The non-linear relationship may be dynamically biased to cause the scrollbar thumb's location to trend towards a standard linear relationship, while still allowing natural-feeling scrolling.

In one or more implementations, when the user is in the process of scrolling content (e.g., holding a finger on the scrollbar thumb or dragging the scrollbar thumb with a mouse), dynamic content is detected. In response to detecting the dynamic content, a dynamic scroll mode is activated. The dynamic scroll mode dynamically adjusts a scroll ratio of the scrollbar without changing a visual position of the scrollbar thumb. In some cases, the dynamic scroll mode applies different scroll ratios for at least two different directions of the scrollbar such that substantially identical movement of the scrollbar thumb in either direction will reduce the delta between the displayed location of the scrollbar thumb and the position that the scrollbar thumb would have been if maintaining a linear relationship of the scrollbar thumb with the content (e.g., scrolls faster downwards than upwards until back to direct linear relationship).

Unlike conventional solutions, the described techniques enable scrolling to any and all dynamically added content while the scrollbar thumb is selected (even without release of the scrollbar thumb). Further, the scrollbar thumb does not jump around to different locations on the scrollbar track as content is dynamically added. Thus, the described techniques enable the user to continue navigation of content using the scrollbar without having to un-select the scrollbar thumb, and then re-select the scrollbar thumb at a new position, thus being less confusing for the user than conventional scrollbar solutions.

Example Environment

FIG. 1a is an illustration of an environment 100 in an example implementation that is operable to support techniques described herein. The illustrated environment 100 includes a computing device 102 having one or more hardware components, examples of which include a processing system 104 and a computer-readable storage medium that is illustrated as a memory 106 although other components are also contemplated as further described below.

The computing device 102 may be configured in a variety of ways. For example, a computing device may be configured as a computer that is capable of communicating over a network, such as a desktop computer, a mobile station, an entertainment appliance, a set-top box communicatively coupled to a display device, a wireless phone, a game console, educational interactive devices, point of sales devices, and so forth. Thus, the computing device 102 may range from full resource devices with substantial memory and processor resources (e.g., personal computers, game consoles) to a low-resource devices with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures, and so on.

The computing device 102 is further illustrated as including an operating system 108, although other embodiments are also contemplated in which an operating system is not employed. The operating system 108 is configured to abstract underlying functionality of the computing device 102 to applications 110 that are executable on the computing device 102. For example, the operating system 108 may abstract the processing system 104, memory 106, and/or network functionality of the computing device 102 such that the applications 110 may be written without knowing "how" this underlying functionality is implemented. The application 110, for instance, may provide data to the operating system 108 to be rendered and displayed without understanding how this rendering will be performed. The operating system 108 may also represent a variety of other functionality, such as to manage a file system and user interface that is navigable by a user of the computing device 102.

Computing device 102 is further illustrated as including a display device 112 that can be controlled to render or display images for viewing. In environment 100, display device 112 is illustrated as integrated component of computing device 102. Alternatively, display device can be implemented as an external, peripheral component to computing device 102. In one or more implementations, display device 112 is implemented as a touchscreen display configured to receive touch input, such as from a finger of a user's hand 114 a stylus or pen, and so forth. In one or more implementations, display device 112 may be configured to receive touch-free gesture input, such as waving a hand or arm near the display device 112. Display device 112 can also receive input via other input devices, such as a mouse, a keyboard, video cameras, accelerometers, and so forth.

Display device 112 is configured to display a scrollbar user interface 116, which includes a scrollbar 118, on display device 112. Scrollbar user interface 116 can be implemented in a variety of different ways to display a variety of different types of content. For example, scrollbar user interface 116 can be implemented as a web browser user interface that display web page content, a media content application user interface that displays a list of photos and/or videos, a contacts application user interface that displays a list of contacts, and so forth.

Figure 1B:
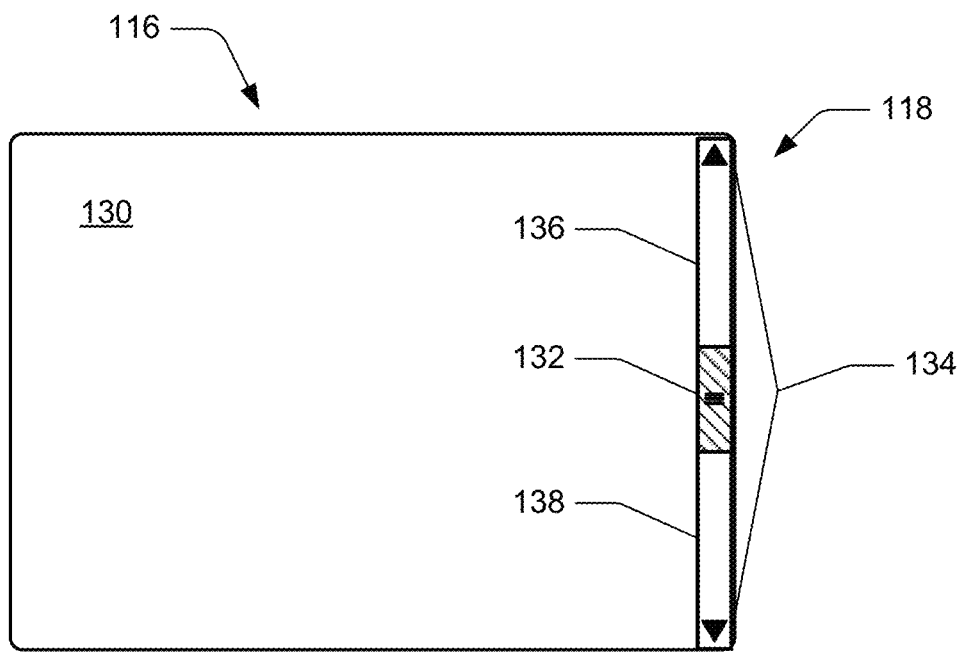
FIG. 1b illustrates a more-detailed example of the scrollbar user interface and scrollbar described in FIG. 1a in accordance with one or more implementations.

Scrollbar user interface 116 is configured to display a portion of content, and enable navigation or "scrolling" to other portions of the content via user selection and manipulation of scrollbar 118. FIG. 1b illustrates a more-detailed example of scrollbar user interface 116 and scrollbar 118 described in FIG. 1a in accordance with one or more implementations. In this example, scrollbar user interface 116 includes a viewport 130 a scrollbar thumb 132, a scrollbar track 134, and repeat buttons 136 and 138.

Viewport 130 is configured to visibly display just a portion of the content of a document at any one time. For example, for a list of 100 items, viewport 130 may display 10 items at any one time. As described herein, the term "displayed content" is used to refer to the portion of the available content (e.g. items) that is currently displayed in viewport 130 of scrollbar user interface 116.

In this example, scrollbar 118 is illustrated as including a scrollbar thumb 132 and a scrollbar track 134. Scrollbar track 134 runs substantially the length of viewport 130 in at least one direction (e.g., vertical or horizontal). The relative position of scrollbar thumb 132 on scrollbar track 134 provides a visual indicator of the relative position of the displayed content currently visible in viewport 130 to the total available content of the document. In some cases, scrollbar track 134 may be defined to include the scrolling arrow controls which are positioned above and below scrollbar track 134. Alternately, the scrolling arrow controls may be considered to be separate controls from scrollbar track 134.

Scrollbar thumb 132 can be selected to move along scrollbar track 134 (e.g., up and down or left and right) to navigate to other portions of the content displayed in viewport 130. As described herein, navigating to other portions of the content refers to adjusting the displayed content that is currently visible in viewport 130 to display a different portion of the content. For example, a user can select scrollbar thumb 132 (e.g., by touching scrollbar thumb 132 with the user's finger or a stylus or selecting scrollbar thumb 132 by positioning a cursor of a mouse and clicking), and drag scrollbar thumb 132 downwards along scrollbar track 134 to display other portions of the content in viewport 130 of scrollbar user interface 116.

Scrollbar 118 further includes repeat buttons 136 and 138 which are defined as portions of scrollbar track 134 located above and below scrollbar thumb 132, respectively. Repeat buttons 136 and 138 are selectable to page up or page down, respectively. For example, selection of repeat button 136 will scroll the content to display a page of content above the currently displayed content in viewport 130. Similarly, selection of repeat button 138 will scroll the content to display a page of content below the currently displayed content in viewport 130.

As described herein, any functionality described as being implemented by scrollbar 118 may be implemented by any of the elements of scrollbar 118, such as scrollbar thumb 132, scrollbar track 134, and/or repeat buttons 136 and 138.

While scrollbar 118 is described throughout as being a vertically-oriented scrollbar, it is to be appreciated that the described techniques may be applied to any type of scrollbar, such as horizontally-oriented scrollbars, four-way scrollbars, and so forth. Additionally, in some cases the described techniques may be applied to "non-linear" scrollbar tracks, such as curved or circular scrollbar tracks. For example, a digital smart watch display may include a curved scrollbar track around at least a portion of a circular perimeter of the watch display.

Computing device 102 is further illustrated as including a scrollbar module 120 that is stored on computer-readable storage memory (e.g., memory 106), such as any suitable memory device or electronic data storage implemented by the mobile device. In implementations, scrollbar module 120 is a component of the device operating system.

Scrollbar module 120 is representative functionality to detect dynamic content for display in scrollbar user interface 116 while scrollbar thumb 132 is selected, and activate a dynamic scroll mode for scrollbar 118 to enable navigation to initial content and the dynamic content while the scrollbar thumb 132 is still selected. The dynamic scroll mode dynamically adjusts a scroll ratio of scrollbar 118 without changing a visual position of the scrollbar thumb 132. As described herein, a "scroll ratio" is the ratio of relative movement of content through scrollbar user interface 116 to relative movement of scrollbar thumb 132.

In some cases, scrollbar module 120 dynamically adjusts at least one scroll ratio of scrollbar 118 based on a linear relationship target position, which is discussed in more detail with regards to FIG. 5, below. Alternately or in addition, scrollbar module 120 can dynamically adjust at least one scroll ratio of scrollbar 118 based on a baseline position, which is discussed in more detail with regards to FIG. 6, below.

Figure 9:
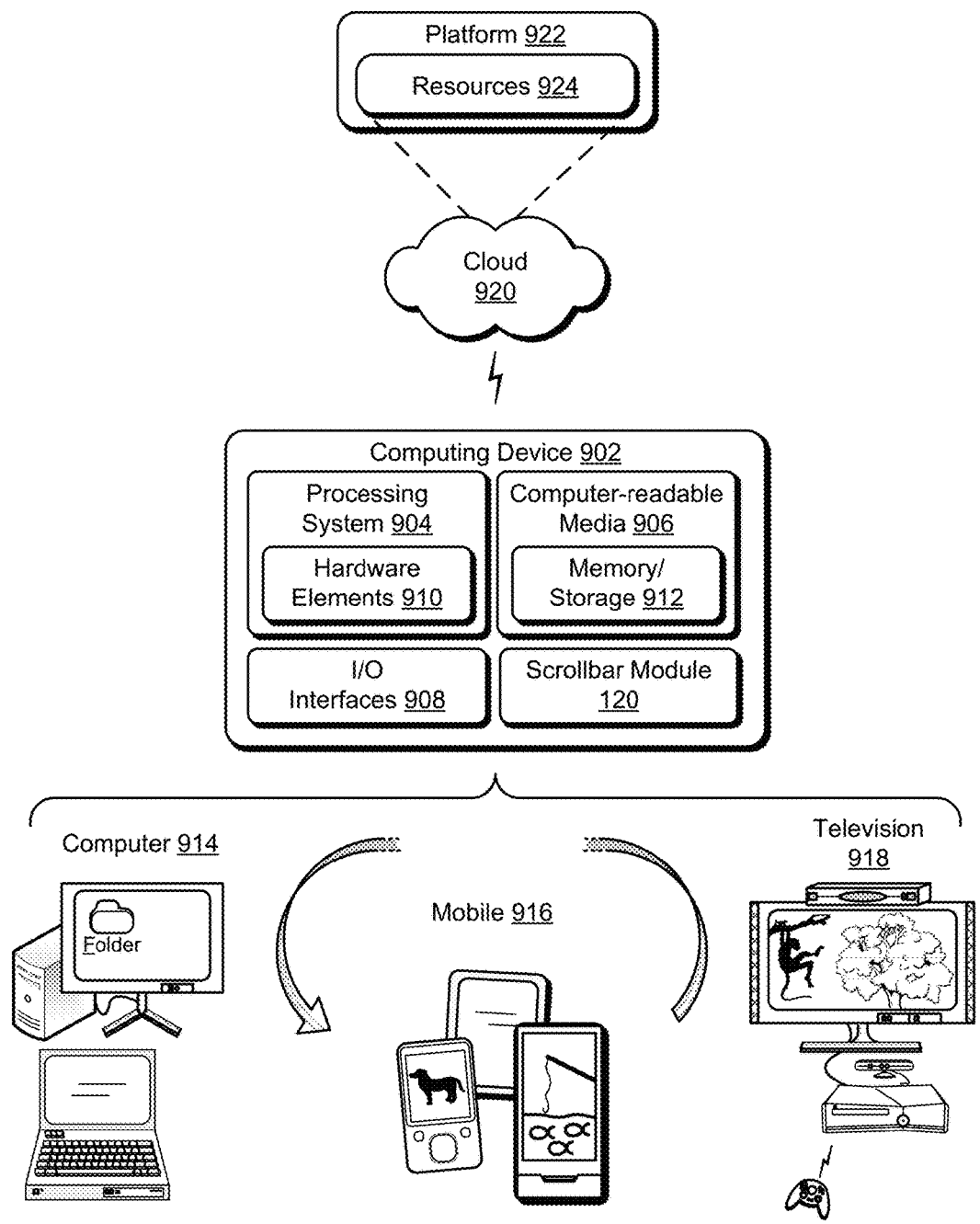
FIG. 9 illustrates an example system that includes an example device, which can implement embodiments of a scrollbar for dynamic content.

Although illustrated as part of computing device 102, functionality of scrollbar module 120 may also be implemented in a distributed environment, remotely via a network 122 (e.g., "over the cloud") as further described in relation to FIG. 9, and so on. Although network 122 is illustrated as the Internet, the network may assume a wide variety of configurations. For example, network 122 may include a wide area network (WAN), a local area network (LAN), a wireless network, a public telephone network, an intranet, and so on. Further, although a single network 122 is shown, network 122 may also be configured to include multiple networks.

Dynamic Scroll Mode

Figure 2:
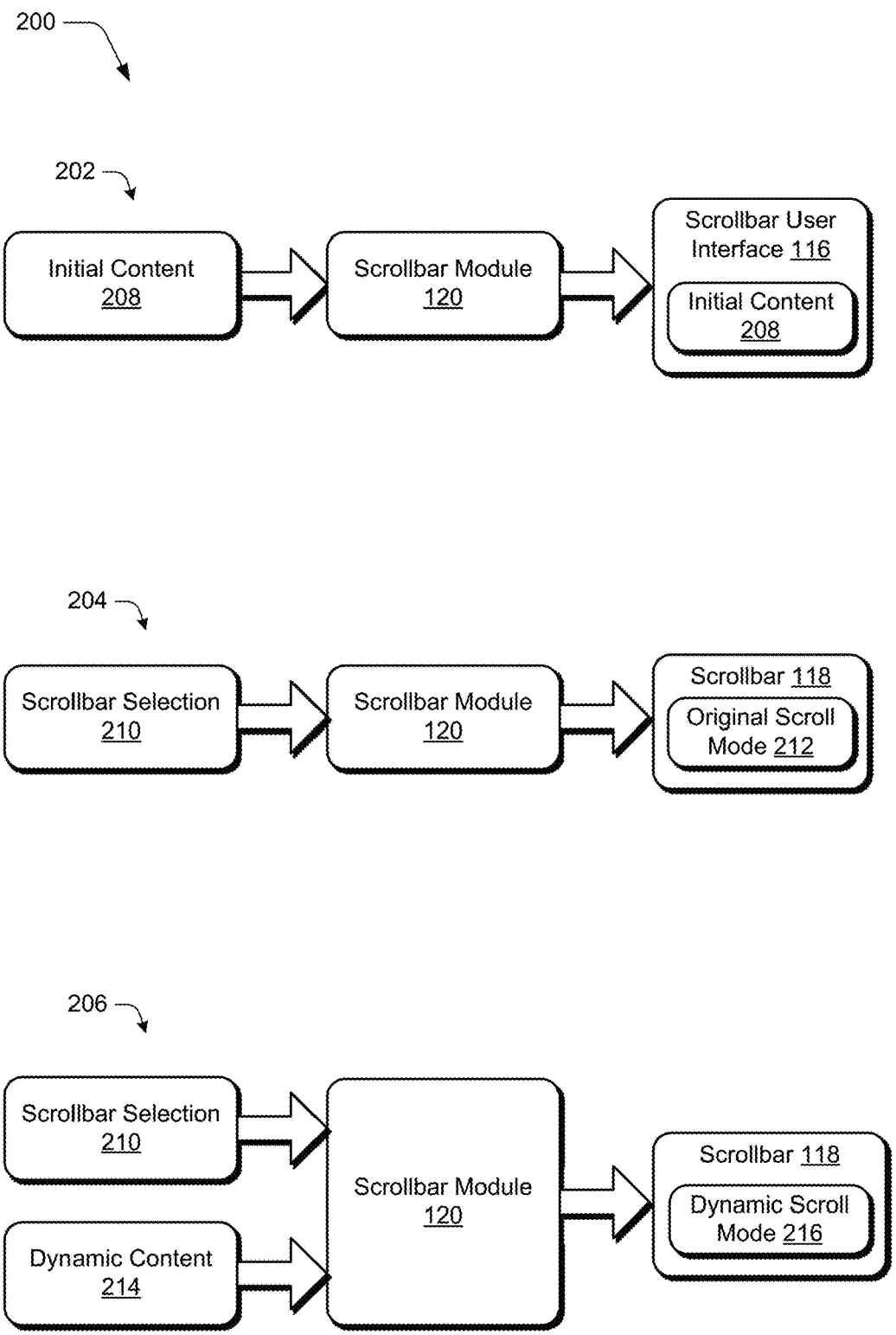
FIG. 2 illustrates a system in which a scrollbar module initiates a dynamic scroll mode responsive to detecting dynamic content.

FIG. 2 illustrates a system 200 in which scrollbar module 120 initiates a dynamic scroll mode responsive to detecting dynamic content. System 200 is illustrated through the use of first, second, and third stages 202, 204, and 206, respectively.

At first stage 202, scrollbar module 120 receives initial content 208 associated with a document, and causes display of initial content 208 in scrollbar user interface 116. To do so, scrollbar module 120 presents a portion of initial content 208 in viewport 130 of scrollbar user interface 116, and enables navigation to other portions of initial content 208 via selection and manipulation of scrollbar 118.

Figure 3:
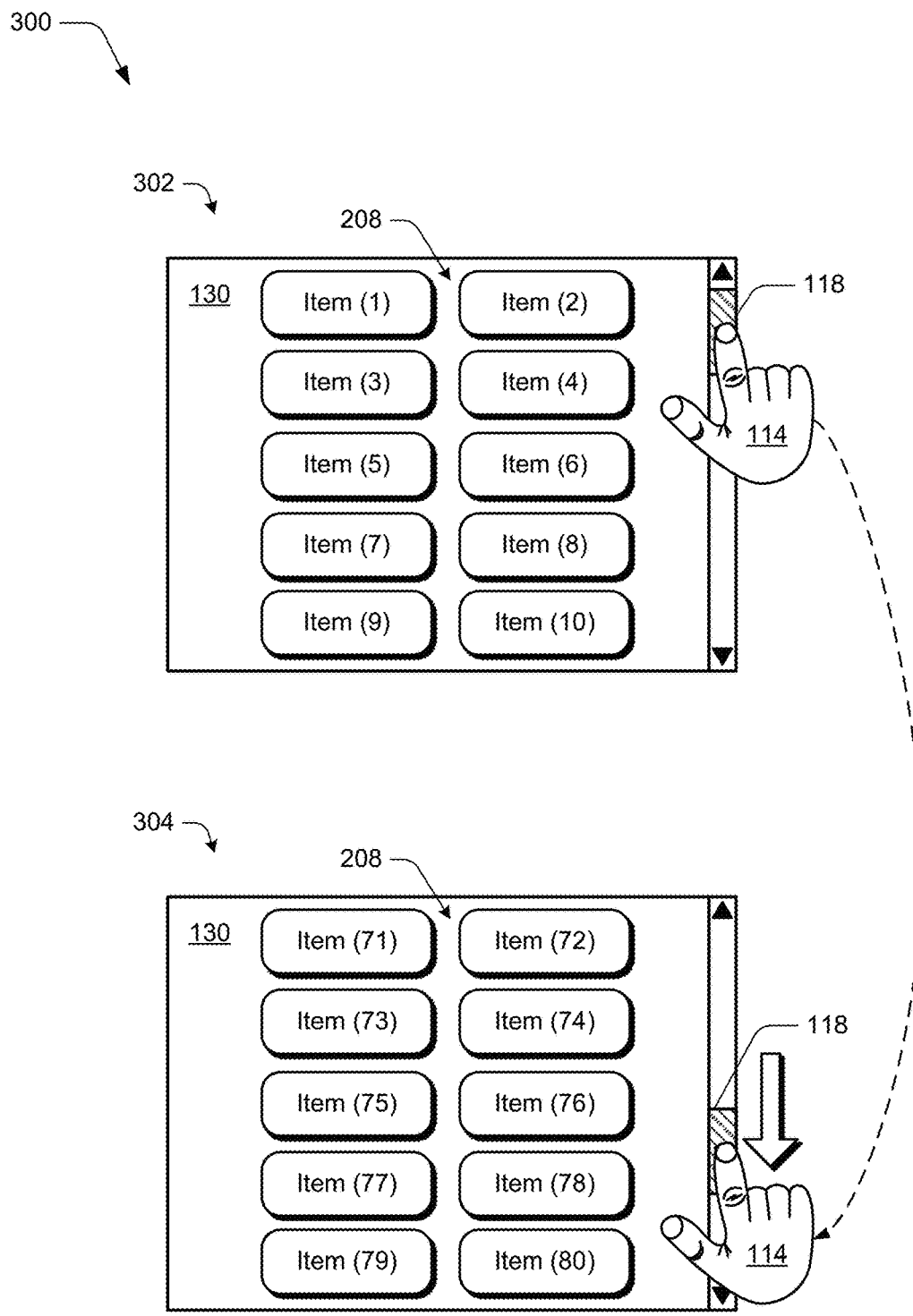
FIG. 3 illustrates an example of displaying content in a scrollbar user interface.

By way of example, consider FIG. 3 which illustrates an example 300 of displaying content in a viewport 130 of scrollbar user interface 116. At a first stage 302, a portion of initial content 208 is displayed in viewport 130 of scrollbar user interface 116. In example 300, initial content 208 is illustrated as multiple items in a list of items. Each item of initial content 208 may correspond to any type of item associated with the initial content, such as news items in a social network newsfeed, images in a list of images, contacts in a list of contacts, lines of text, paragraphs of text, and so forth. It is to be appreciated, that illustrating initial content 208 as a list of items is done as an example, and that initial content 208 is not limited to a list of items, but rather may correspond to any type of content from any type of content source or document.

For purposes of discussion, assume that initial content 208 associated with the document includes 100 different items, and that scrollbar user interface 116 is sized to display 10 items, or 10%, of the 100 items at any one time in viewport 130. Thus, in example 300, just a portion of initial content 208 (e.g., items 1 to 10) is displayed in viewport 130 of scrollbar user interface 116. Scrollbar 118 enables scrolling to other portions of the initial content 208 (e.g., items 11 to 100).

At second stage 204, scrollbar module 120 receives a scrollbar selection 210 of scrollbar 118 to scroll the initial content 208 displayed in scrollbar user interface 116. Scrollbar selection 210 may be received responsive to the finger of the user's hand 114 touching and dragging scrollbar thumb 132. Alternately, scrollbar selection 210 may be received responsive to an input device, such as a mouse, navigating a cursor over scrollbar thumb 132, selecting (e.g., holding a mouse button) scrollbar thumb 132, and dragging scrollbar thumb 132. In embodiments, scrollbar selection 210 may correspond to other types of input to scrollbar 118, such as touches directly under scrollbar thumb 132, pressing and holding the middle mouse button, gestures that map to moving the scrollbar thumb 132, voice commands, combinations of such input, and so forth.

Responsive to receiving scrollbar selection 210, scrollbar module 120 causes scrollbar thumb 132 to move and scrolls initial content 208 in an original scroll mode 212. Generally, original scroll mode 212 applies a linear scroll ratio which causes initial content 208 to be scrolled through scrollbar user interface 116 in direct proportion to the movement of scrollbar thumb 132 along scrollbar track 134. However, scrollbar module 122 is not limited to applying a linear scroll ratio in original scroll mode 212.

As an example of the linear scroll ratio, turning again to FIG. 3, at a second stage 304 scrollbar thumb 132 is selected and dragged from the top of scrollbar track 134 to a position approximately 70% of the way down scrollbar track 134. Responsively, scrollbar module 120 scrolls initial content 208 such that items 71-80 are now displayed in viewport 130 of scrollbar user interface 116. Thus, the movement of the displayed initial content 208 directly corresponds to the movement of scrollbar 118. Further, the positioning of scrollbar 118 relative to the total length of scrollbar track 134 (70%) corresponds to, and indicates, the position of the displayed initial content 208 relative to the total initial content (70%).

At third stage 206, while scrollbar 118 is still selected, dynamic content 214 associated with the document is detected by scrollbar module 120. Dynamic content 214 includes additional content, such as additional content items, for display in scrollbar user interface 116.

Dynamic content 214 may correspond to a dynamic modification of initial content 208. In some cases, the dynamic modification of initial content 208 may correspond, instead, to a dynamic removal or alteration of initial content 208. For example, rather than adding content items, the dynamic modification may remove content items from initial content 208, or alter the order of the items of initial content 208.

A dynamic modification of content may correspond to a "position changing update" or a "minor update". As described herein, a minor update corresponds to a minor addition or removal of content relative to the initial content (e.g., the addition of just 10 items to a list of 10,000 items). A minor update, therefore, may result in the same displayed thumb position on scrollbar track 134. In contrast, a position changing update may correspond to a substantial addition or removal of content relative to initial content 208 (e.g., the addition of 100 items to a list of 100 items). In the past, position changing updates would cause the thumb position on scrollbar track 134 to move to maintain the linear relationship between scrollbar thumb 132 and the initial content and dynamic content.

In some cases, the addition of dynamic content 214 may be triggered by the position and/or movement of scrollbar thumb 132. For example, dragging scrollbar thumb 132 down near the bottom of scrollbar track 134 may cause dynamic content 214 to be received for display. Alternately, dynamic content 214 may be triggered by a predetermined time period, or an amount of time proportional to the time required to load initial content 208. For example, an initial portion of content may be loaded for display initially, and then after some time passes, an additional portion of content may be loaded for display.

Figure 4:
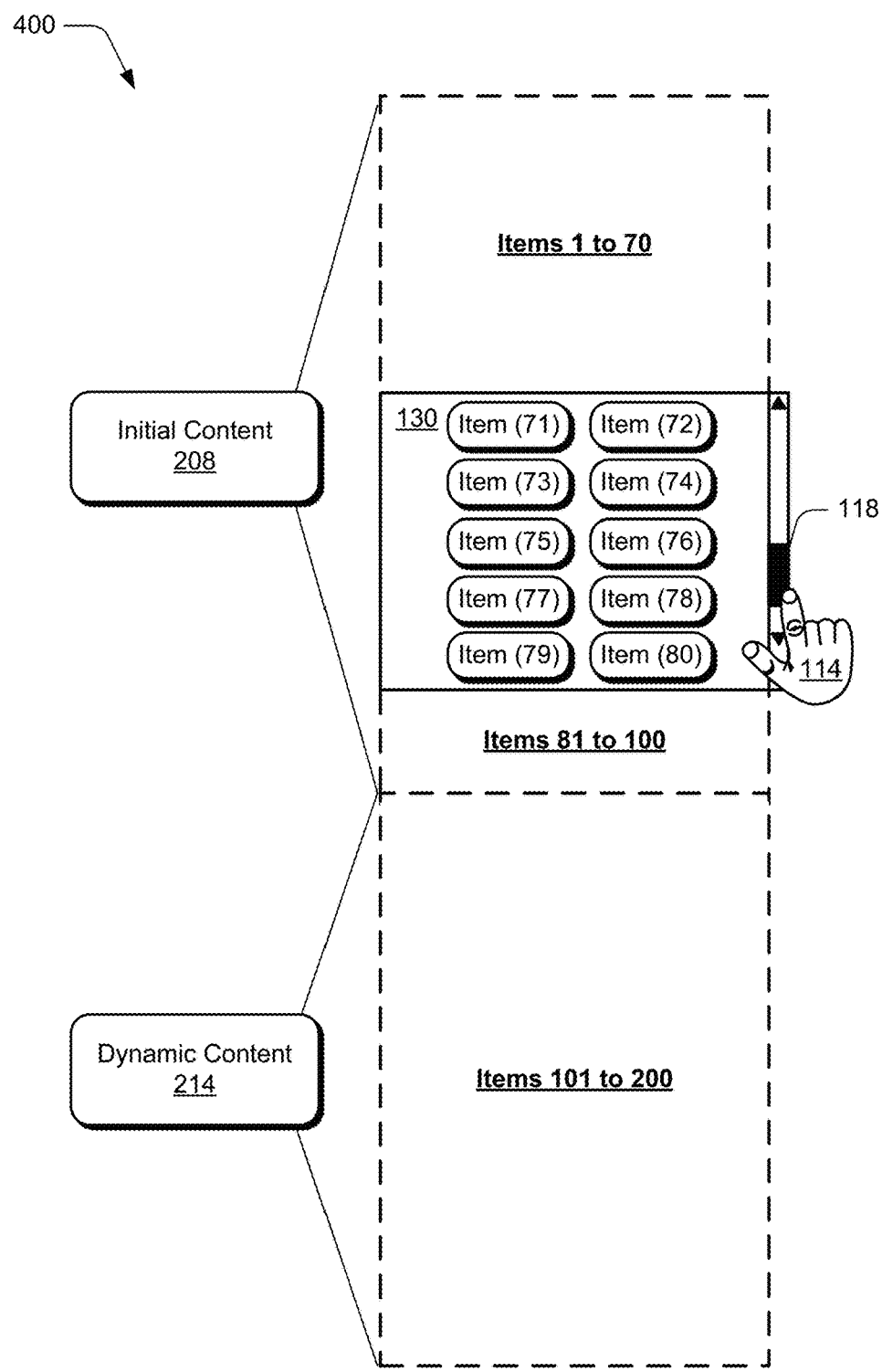
FIG. 4 illustrates an example of detecting dynamic content while a scrollbar thumb is selected.

FIG. 4 illustrates an example 400 of detecting dynamic content while a scrollbar thumb 132 is selected. In example 400, scrollbar thumb 132 has been selected and dragged to a position approximately 70% down scrollbar track 134 (as also shown at second stage 304 of FIG. 3), and responsively scrollbar module 120 scrolls the initial content 208 to cause items 71-80 to be displayed in viewport 130 of scrollbar user interface 116.

In this example, scrolling down near the end of initial content 208 triggers the document to provide dynamic content 214, which in this example includes 100 additional items. For example, the 100 additional items may correspond to 100 additional news feed items for a social network, 100 additional images returned for an image search, and so forth. In this example, the 100 additional items of dynamic content 214 are to be displayed below the items of initial content 208. In some cases, however, dynamic content 214 can be added above initial content 208 or throughout initial content 208 (e.g., adding contacts to an alphabetized list of contacts).

Note that the addition of dynamic content 214 alters the relationship between the position of scrollbar thumb 132 within scrollbar track 134, and the position of the displayed content within available content. For example, prior to detecting dynamic content 214, scrollbar thumb 132 was positioned approximately 70% of the way down scrollbar track 134, and scrollbar user interface 116 was displaying content that was approximately 70% of the way through the initial content 208. Thus, the position of scrollbar thumb 132 along scrollbar track 134 provided an indication of the position of initial content 208 displayed in scrollbar user interface 116. Dynamic content 214, however, adds 100 additional items, such that there are now 70 items positioned above the initial content 208 currently displayed in scrollbar user interface 116, and 130 items (including the currently displayed content) below (approximately 35% of the way). Thus, the position of scrollbar thumb 132 along scrollbar track 134 no longer has a linear relationship to the position of the content being displayed in scrollbar user interface 116.

In response to detecting dynamic content 214, scrollbar module 120 activates a dynamic scroll mode 216. Dynamic scroll mode 216 enables navigation to both the initial content 208 and the dynamic content 214, without the need to release or un-select scrollbar 118. In embodiments, the user can scroll up and/or down using scrollbar thumb 132, without releasing scrollbar thumb 132, to view each item of initial content 208 and dynamic content 214.

Notably, unlike conventional solutions, scrollbar module 120 activates dynamic scroll mode 216 without substantially moving the displayed position of scrollbar thumb 132 and without causing the content displayed in viewport 130 of scrollbar user interface 116 to jump to the new linear relationship position. Doing so is less confusing for the user, and enables the user to continue navigation of the content using scrollbar 118 without having to un-select scrollbar 118, and then re-select scrollbar 118 at a new position. For example, the scrollbar thumb 132 may remain selected.

To activate dynamic scroll mode 216, scrollbar module 120 dynamically adjusts at least one scroll ratio of scrollbar 118, based on the total content available to be displayed (e.g., both initial content 208 and dynamic content 214). In embodiments, activating dynamic scroll mode increases and/or decreases a scroll ratio of scrollbar 118 from original scroll mode 212.

As described herein, increasing a scroll ratio of scrollbar 118 causes scrollbar module 120 to change the display of content at a faster rate relative to a corresponding movement of scrollbar thumb 132. As an example, when a downwards scroll ratio of scrollbar 118 is two times the linear scroll ratio, moving scrollbar thumb 132 from an initial position located 40% down scrollbar track 134 to a position 60% down scrollbar track 134 for a list of 100 items causes the items displayed in scrollbar user interface 116 to jump 40 items (40% change in content for a 20% change downward in scrollbar thumb 132 position).

Conversely, decreasing a scroll ratio of scrollbar 118 causes scrollbar module 120 to change the display of content at a slower rate relative to a corresponding movement of scrollbar thumb 132. As an example, when a downward scroll ratio of scrollbar 118 is half the linear scroll ratio, moving scrollbar thumb 132 from an initial position located 40% down scrollbar track 134 to a position 60% down scrollbar track 134 for a list of 100 items causes the items displayed in scrollbar user interface 116 to jump 10 items (10% change in content for a 20% change downward in scrollbar thumb 132 position).

Scroll Ratios Based on a Linear Relationship Target Position

In one or more implementations, scrollbar module 120 dynamically adjusts scroll ratios of scrollbar 118 such that scrollbar 118 includes different scroll ratios for at least one pair of opposing directions. As described herein, a pair of opposing or opposite directions corresponds to a pair of directions that are directly opposite each other (e.g., up and down, right and left, clockwise and anti-clockwise/counter-clockwise, two directions along a single scrollbar track generally configured to navigate content in opposing directions). Note, therefore, that a pair of opposing directions is distinguishable from a pair of different directions which may be different but not opposite (e.g., up and right, or down and left).

In one or more implementations, scrollbar 118 can be configured by increasing the scroll ratio in a first direction (e.g., down) and decreasing the scroll ratio in a second direction opposite the first direction (e.g., up) such that movement of scrollbar thumb 132 in the first direction changes the content displayed in scrollbar user interface 118 at a faster rate than a unit of movement of scrollbar thumb 132 in the second direction.

In one or more implementations, scrollbar module 120 can configure the scroll ratios of scrollbar 118 based on a linear relationship target position. The linear relationship target position corresponds to the position at which scrollbar thumb 132 would be located after the dynamic content 214 is added, if the linear relationship were maintained.

Figure 5:
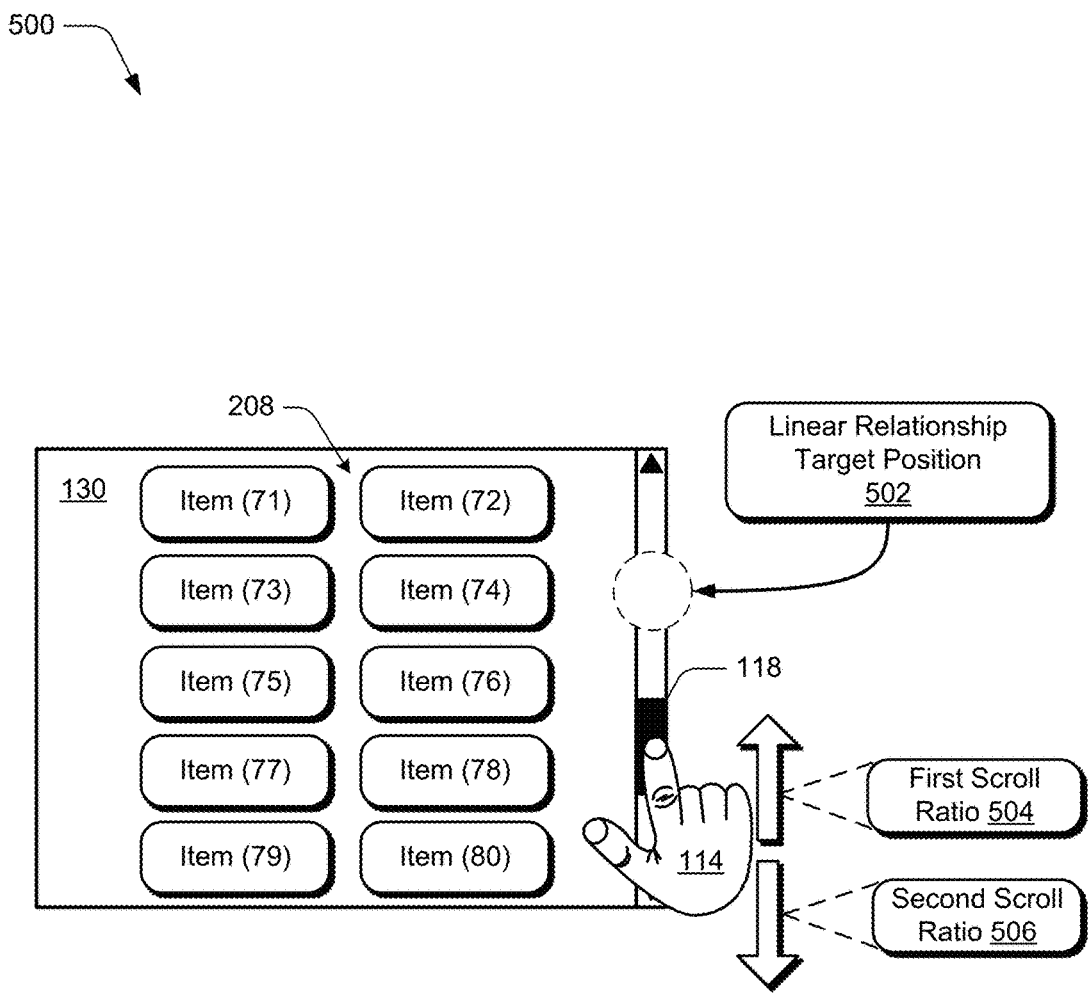
FIG. 5 illustrates an example of dynamically adjusting scroll ratios for a scrollbar based on a linear relationship target position in accordance with one or more implementations.

By way of example, consider FIG. 5, which illustrates an example 500 of dynamically adjusting scroll ratios for a scrollbar based on a linear relationship target position in accordance with one or more implementations.

In example 500, responsive to detecting dynamic content 214, scrollbar module 120 determines a linear relationship target position 502 of scrollbar 118 based on dynamic content 216. In this example, dynamic content 214 adds 100 additional items such that there are now 70 items above what is displayed by scrollbar user interface 116, and 130 items below (including the items currently displayed in scrollbar user interface 116). Thus, the linear relationship target position 502 of scrollbar 118 is at 35% of scrollbar track 134 (70 items out of 200 total items), which is above the current position of scrollbar thumb 132 along scrollbar track 134.

After determining linear relationship target position 502, scrollbar module 120 decreases a first scroll ratio 504 of scrollbar 118 towards the linear relationship target position 502, and/or increases a second scroll ratio 506 of scrollbar 118 away from the linear relationship target position. In this example, because the linear relationship target position 502 is above the current position of scrollbar thumb 132, scrollbar module 120 adjusts the scroll ratio of scrollbar 118 such that the downwards scroll ratio is relatively faster than the upwards scroll ratio.

Scrollbar module 120 can determine values for first scroll ratio 504 and second scroll ratio 506 in a variety of different ways. Generally, scrollbar module 120 determines the scroll ratios to cause the position of scrollbar thumb 132 and the displayed content to trend back towards the direct linear relationship as scrollbar thumb 132 moves upwards and downwards.

Once activated, the dynamic scroll ratios of scrollbar 118 may also modify the position of scrollbar thumb 132, even when using other methods to change the content displayed in viewport 130. For example, selection of repeat buttons 136 or 138 may still move a single page of content up or down, respectively, but the displayed position of scrollbar thumb 132 will be updated according to the new scroll ratio (e.g., scroll ratio 504 or 506).

Consider, by way of example and not limitation, that scrollbar module 120 determines first scroll ratio 504 (in the upwards direction) to be half the linear scroll ratio, and determines second scroll ratio 506 (in the downwards direction) to be two times the linear scroll ratio.

Now, if scrollbar thumb 132 is scrolled downwards from the 70% position to a 90% position (a total change of 20%) on scrollbar track 134, second scroll ratio 506 causes the displayed content to scroll at two times the linear scroll ratio. Accordingly, this causes display of items 151-160 of dynamic content 214 (80 items out of 200 total items corresponds to a 40% change in the content displayed in scrollbar user interface 116 for a 20% movement of scrollbar thumb 132).

Continuing with this example, if scrollbar thumb 132 is then scrolled upwards from the 90% position back to the 70% position (a total change of 20%), first scroll ratio 504 causes the displayed content to scroll at half the linear scroll ratio. Accordingly, this causes display of items 131-140 of dynamic content 214 in viewport 130 (20 items out of 200 total items corresponds to a 10% change in the content displayed in scrollbar user interface 116 for a 20% movement of scrollbar thumb 132).

By moving scrollbar thumb 132 20% downwards and then back up to the same position at 70%, the position of the displayed content has scrolled downwards a net of 60 items. Notably, while the position of the scrollbar thumb 132 is back at 70%, the position of the displayed content has changed from 35% to 65% (130 items out of 200 total items). Thus, the relationship between the position of scrollbar 118 and the displayed content is trending back towards the direct linear relationship as scrollbar 118 is moved downwards and upwards.

As another example, consider that from the initial position in example 500, if scrollbar thumb 132 is scrolled upwards from the 70% position to a 0% position (a total change of 70%) on scrollbar track 134, first scroll ratio 504 causes the displayed content to scroll at half the linear scroll ratio. Accordingly, this causes display of items 0-10 of the initial content in viewport 130 (70% scrollbar change at half ratio results in a 35% viewport change; 35% of 200 total items corresponds to 70 items of movement). At this point, because the position of scrollbar thumb 132 (0%) corresponds to the position of the displayed content (0%), scrollbar 118 may return to a linear scroll mode.

As another example, consider that from the initial position in example 500, if scrollbar thumb 132 is scrolled upwards (and temporarily released) from the 70% position to a 10% position (a total change of 60%) on scrollbar track 134. The first scroll ratio 504 again causes the displayed content to scroll at half the linear scroll ratio. Accordingly, this causes display of items 10-20 of the initial content in viewport 130 (60 items out of 200 total items corresponds to a 30% change in the content displayed in scrollbar user interface 116 for a 60% movement of scrollbar thumb 132). Note also, that this position corresponds to 5% of the displayed content. Now, if scrollbar thumb 132 is scrolled downwards from the 10% position back to the 70% position (a total change of 60%) on scrollbar track 134, second scroll ratio 506 causes the displayed content to scroll at two times the linear scroll ratio. Accordingly, this causes display of items 130-140 of the content to be displayed in viewport 130 (120 items scrolled for 60% movement of scrollbar thumb 132). At this point, because the position of scrollbar thumb 132 (70%) is close to the position of the displayed content (65%), scrollbar 118 may return to a linear scroll mode. Sufficiently close may be defined as within a few pixels of a linear relationship, the linear relationship position being within a dead zone of the scrollbar, within a predetermined percentage, or the like.

In implementations, one or more of the dynamic scroll ratio(s), in implementations including the area of the track affected by the corresponding scroll ratio, may be updated only a given condition occurring, such as upon release of the scrollbar (e.g., removing a user's finger from the scrollbar thumb 132, releasing the mouse button that was dragging the scrollbar thumb 132, etc.). Examples of such conditions are listed in the next paragraph. In such implementations, if the above scrolling motions from 70% to 5% and back to 70% occurred without releasing the scrollbar, the viewport would once again display items 71 . . . 80 (the original content) and retain the same scroll ratios.

Scrollbar module 120 can update linear relationship target position 502 after a scrollbar 118 update, such as user manipulation of the scrollbar 118, user manipulation of the scrollbar thumb 132, or other modification of the displayed content causing an update to the scrollbar thumb position. In some cases, the linear relationship target position 502 and dynamic scroll ratios 504 and 506 are continuously adjusted as the user manipulates scrollbar 118, or as the position of viewport 130 changes. Alternately, scrollbar module 120 may wait to update linear relationship target position 502 and/or scroll ratios 504 and 506 until a given condition occurs. As examples, these conditions may include the movement of scrollbar 118 being paused, the selection of scrollbar 118 ending, or a pause of predetermined length between user inputs. Once the direct linear relationship between scrollbar 118 and the displayed content is reached, scrollbar module 120 can switch back to original scroll mode 212 to cause scrollbar 118 to scroll the content using the linear scroll ratio.

Scroll Ratios Based on a Baseline Position

In one or more implementations, scrollbar module 120 configures scrollbar 118 with different scroll ratios for two different regions of scrollbar 118. The two different regions of scrollbar 118 may be split around a baseline position, which is defined as the position of scrollbar thumb 132 when dynamic scroll mode 216 is activated.

Figure 6:
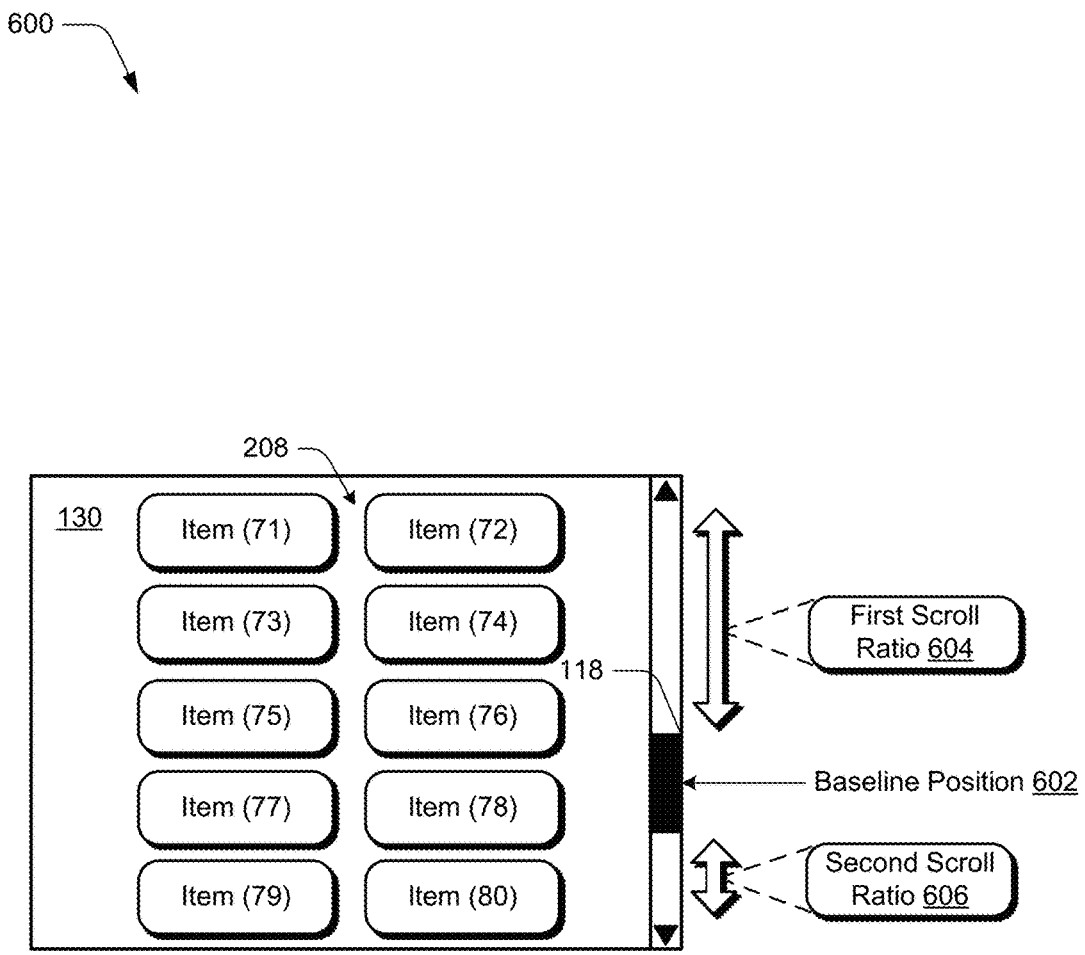
FIG. 6 illustrates an example of dynamically adjusting scroll ratios for a scrollbar based on a baseline position in accordance with one or more implementations.

By way of example, consider FIG. 6 which illustrates an example 600 of dynamically adjusting scroll ratios for a scrollbar based on a baseline position in accordance with one or more implementations.

In this example, scrollbar module 120 determines a baseline position 602 of scrollbar thumb 132 as 70% of the way down scrollbar track 134, which corresponds to the position of scrollbar thumb 132 when dynamic scroll mode 216 is activated.

After determining baseline position 602, scrollbar module 120 configures scrollbar 118 with a first scroll ratio 604 for movement of scrollbar thumb 132 in a first region above baseline position 602, and a second scroll ratio 606 for movement of scrollbar thumb 132 in a second region below baseline position 602. In embodiments, these regions correspond to the repeat button regions above and below scrollbar thumb 132 at the time that dynamic scroll mode was activated or updated. Notably, first scroll ratio 604 and second scroll ratio 606 apply to movement in either direction in the regions above or below baseline position 602, respectively.

Scrollbar module 120 determines first scroll ratio 604 and second scroll ratio 606 based on baseline position 602, and the relative amount of content above and below baseline position 602, respectively. Scrollbar module 120 may calculate the scroll ratios to ensure that a scrollbar thumb 132 position of 0% will cause the beginning of the content to be displayed in viewport 130 of scrollbar user interface 116, and that a scrollbar thumb 132 position of 100% will cause the end of the content to be displayed in viewport 130 of scrollbar user interface 116. In embodiments, scrollbar module 120 may calculate the scroll ratios to ensure that a scrollbar thumb 132 position at the baseline position 602 will show the same content as when dynamic scroll mode was activated or updated.

In example 600, since there are 130 content items below and 30% of the scrollbar remaining, scrollbar module 120 may determine the scroll ratio downwards and upwards such that a 100% position of scrollbar thumb 132 causes items 191-200 to be displayed in viewport 130 of scrollbar user interface 116. In this example, since there are 70 content items above scrollbar thumb 132 when positioned at 70%, scrollbar module 120 may maintain the linear scroll ratio for first scroll ratio 604, such that a 0% position of scrollbar thumb 132 causes items 1-10 to be displayed in viewport 130 of scrollbar user interface 116.

Scrollbar module 120 may consider baseline position 602 to be a "dead zone" of non-zero width, such that movement of scrollbar 118 within the dead zone is treated as non-movement. Alternately, scrollbar module 120 may apply the original scroll ratio that existed before the dynamic scroll mode 216 was activated (e.g., the linear scroll ratio) to scrollbar movement within the dead zone. In embodiments, scrollbar module 120 may have two non-zero width dead zones, with movement in the smaller dead zone treated as non-movement and movement in the larger (but not in the smaller) applying the original scroll ratio that existed before the dynamic scroll mode was activated (e.g., the linear scroll ratio).

In one or more implementations, scrollbar module 120 increases the scroll ratio of scrollbar 118, as scrollbar thumb 132 is being moved, based on a distance of scrollbar thumb 132 from baseline position 602. In some cases, the scroll ratio may increase linearly based on the distance from baseline position 602. For example, as scrollbar thumb 132 moves downwards and away from baseline position 602, scrollbar module 120 may cause the scroll ratio to be twice the linear scroll ratio for 10% scrollbar movement, then four times the linear scroll ratio for the next 10% scrollbar movement, and so on. Alternately, the increase of the scroll ratio may be non-linear (e.g., logarithmic or exponential). Additionally, the increase of the scroll ratio may be a smooth increase (e.g., a smooth acceleration), or stepped (e.g., 10 items for a first range, 20 items for a second range, 55 items for a third range, and so on).

In one or more implementations, scrollbar module 120 may calculate the scroll ratios using graphs of pre-calculated scroll distance versus displayed data. The graphs may be pre-calculated to store a value based on the length of the scrollbar track for a given desired curve. A value may be stored for each possible position of the thumb, or be interpolated for a given position from fewer pre-calculated values. Thus, the pre-calculated values would need only be scaled based on available items (or when the length of the track changes). For example, the graph may include pre-defined curves (e.g., logarithmic or exponential) corresponding to the acceleration of the scroll ratios. In this case, the area under the curve may correspond to the total number of items (e.g., lines of text, photos, files, etc.). These predefined curves can then be easily modified based on the number of items. For example, when the content items are doubled the curve may be multiplied by a factor of 2, whereas if the content items are cut in half the curve may be divided by a factor of 2. Thus, scrollbar module 120 may use the curves (or corresponding pre-calculated values) to determine which items to show in the viewport for a given scrollbar thumb 132 position using less processing power and/or energy.

Scaling is quite efficient, as opposed to calculating the entire curve each time the dynamic scroll ratio is activated or updated. Power savings may exist by using a unit height curve (e.g., y starts at zero, ends at 1), where the number of stored values and number of pixels of allowed movements in the track are equal (or one is a multiple of the other).

For example, using a unit height curve, storing five pixel positions corresponding to where the scroll ratio is applied (first=baseline position, or end of dead zone), and a linear speed, a table may be generated as follows:

TABLE 1

| Position | 1 | 2 | 3 | 4 | 5 |
|---|---|---|---|---|---|
| Scroll Ratio | 0.0 | 0.25 | 0.50 | 0.75 | 1.00 |

In order to ensure movement of 100 units along that first scroll ratio area, the corresponding delta in items may be calculated as follows:

Delta of Items=100*(new index−current index)

Thus, moving from baseline to the penultimate position would be:

100*(0.75−0.00)=75 units of content movement

As can be appreciated, this takes only a single subtraction and a single multiplication to determine the number of items for the corresponding navigation.

To modify to a linearly increasing speed, the table values may be changed as follows:

TABLE 2

| Position | 1 | 2 | 3 | 4 | 5 |
|---|---|---|---|---|---|
| Scroll Ratio | 0.0 | 0.10 | 0.30 | 0.60 | 1.00 |

Thus, moving from baseline to the penultimate position would be:

100*(0.6−0.0)=60 units of content movement

In one or more implementations, scrollbar module 120 updates the baseline position of scrollbar 118 responsive to detecting a pause in movement of scrollbar 118 (e.g., when the user stops manipulating scrollbar thumb 132, releases scrollbar thumb 132, or stops causing the content displayed in viewport 130 to change for a predetermined period of time). The position of scrollbar thumb 132, when the pause is detected, becomes the new baseline position. Then, scrollbar module 120 determines and applies new scroll ratios above and below the new baseline position in the same manner as discussed above.

While the techniques described herein have been described with regards to altering a scroll ratio of scrollbar 118 responsive to the addition of dynamic content, it is to be appreciated that these techniques may also be applied to the dynamic removal of content. For example, one or more scroll ratios of scrollbar 118 may by adjusted based on the detection of dynamic removal of content, such as where content items are removed from the available content while scrollbar 118 is selected.

In one or more implementations, scrollbar module 120 alters the visual appearance of scrollbar 118 when the dynamic scroll mode 216 is active. In FIGS. 5 and 6, for example, scrollbar module 120 has visually altered the color of scrollbar thumb 132, from gray pattern (as shown in FIG. 3) to black, to provide the user with a visual clue that dynamic scroll mode 216 is active. Of course, scrollbar module 120 can alter the visual appearance of scrollbar 118 in a variety of different ways to indicate that dynamic scroll mode 216 is active, such as by altering the size, color, and/or shape of elements of scrollbar 118, without altering the size of scrollbar 118 in its corresponding dynamic scrolling direction(s).

In embodiments, the alterations to the visual appearance of elements of scrollbar 118 may correspond to the scroll ratio. For example, the intensity of color for the arrow at each end of scrollbar track 134 may correspond to the scroll ratio in each direction. In another example, upper repeat button 136 and lower repeat button 138 may have a different color, darkness, gradient, transparency, or combination thereof applied to indicate the relative scroll ratio in that direction.

Figure 7:
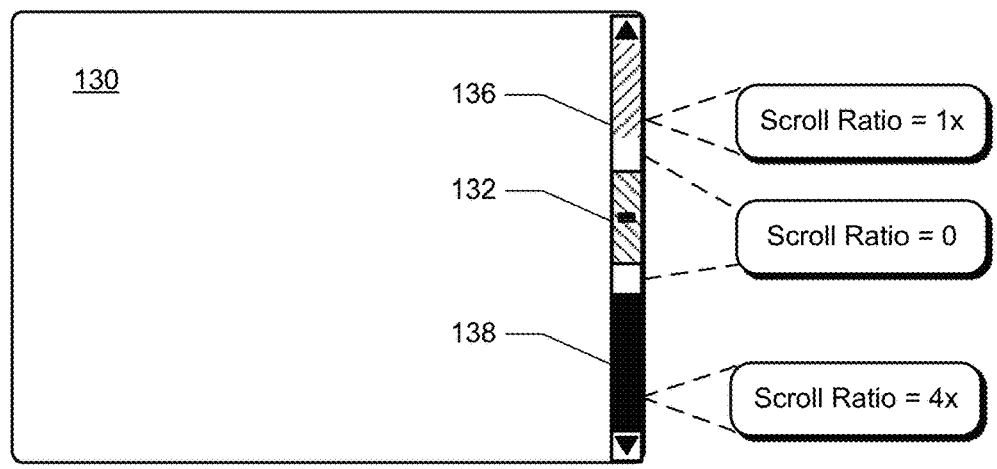
FIG. 7 illustrates an example of altering a visual appearance of a scrollbar in accordance with one or more implementations.

As an example, consider FIG. 7 which illustrates an example 700 of altering a visual appearance of scrollbar 118 in accordance with one or more implementations. In this example, upper repeat button 136 is shown with a pattern to indicate a normal or linear scroll ratio ("1×") in this region of scrollbar 118. A portion of each repeat button 136 and 138, directly next to the current position of scrollbar thumb 132, is colored white to indicate a scroll ratio of 0 (a dead zone), while an additional portion of lower repeat button 138 is colored black to indicate a fast scroll ratio ("4×") in this region of scrollbar 118. In embodiments, a gradient may be applied, such as 138 having a gradient from white (next to dead zone) through black (next to lower arrow).

Example Method

The methods described herein are shown as sets of blocks that specify operations performed but are not necessarily limited to the order or combinations shown for performing the operations by the respective blocks. In portions of the following discussion reference may be made to environment 100 of FIG. 1a and system 200 of FIG. 2, reference to which is made for example only. The techniques are not limited to performance by one entity or multiple entities operating on one device.

Figure 8:
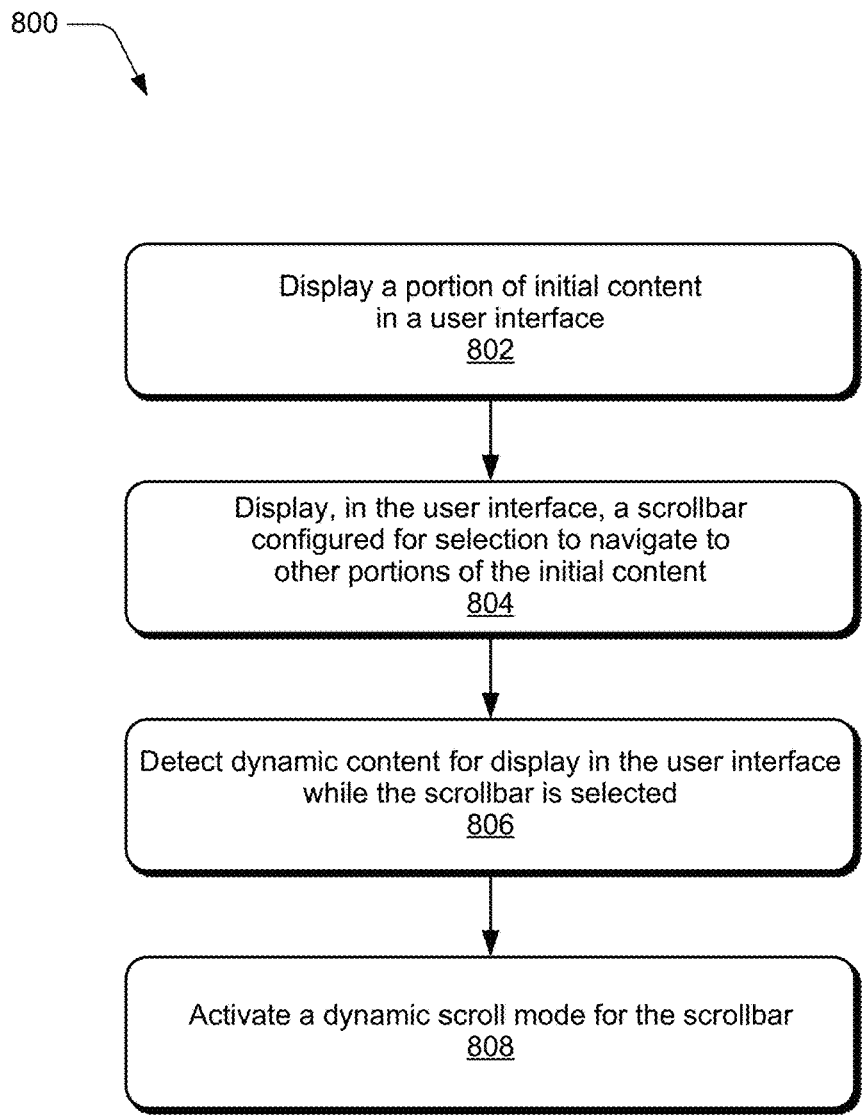
FIG. 8 illustrates an example method of activating a dynamic scroll mode for a scrollbar.

FIG. 8 illustrates an example method 700 of activating a dynamic scroll mode for a scrollbar. At 802, a portion of initial content is displayed in a user interface. For example, scrollbar module 120 causes display of a portion of initial content 208 in scrollbar user interface 116.

At 804, a scrollbar configured for selection to navigate to other portions of the initial content is displayed. For example, scrollbar module 120 causes display of scrollbar 118 that is configured for selection to navigate to other portions of initial content 208.

At 806, dynamic content for display in the user interface is detected while the scrollbar is selected. For example, scrollbar module 120 detects dynamic content 214 while scrollbar 118 is selected.

At 808, a scroll ratio of the scrollbar is dynamically adjusted based on the dynamic content. For example, scrollbar module 120 dynamically adjusts a scroll ratio of scrollbar 118 based on dynamic content 214.

Example System and Device

FIG. 9 illustrates an example system generally at 800 that includes an example computing device 902 that is representative of one or more computing systems and/or devices that may implement the various techniques described herein. The computing device 902 may be, for example, a server of a service provider, a device associated with the client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below. Where a term is preceded with the term "statutory", the term refers to patentable subject matter under 35 U.S.C. § 101. For example, the term "statutory computer-readable media" would by definition exclude any non-statutory computer-readable media.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "communication media."

"Computer-readable storage media" refers to media and/or devices that enable storage of information, in contrast to mere signal transmission, carrier waves, or signals per se. Thus, computer-readable storage media does not include signal bearing media nor signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 902, such as via a network. Communication media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including operating system 108, scrollbar module 120, and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules as a module that is executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. This is illustrated through inclusion of the scrollbar module 120 on the computing device 802. The functionality of the scrollbar module 120 and other modules may also be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

CONCLUSION AND EXAMPLE IMPLEMENTATIONS

Example implementations described herein include, but are not limited to, one or any combinations of one or more of the following examples:

A computer-implemented method comprising displaying a portion of initial content in a user interface; displaying, in the user interface, a scrollbar configured for selection to navigate to other portions of the initial content; detecting, while the dynamic scrollbar is selected, dynamic content for display in the user interface; and dynamically adjusting a scroll ratio of the scrollbar based on the dynamic content.

A computer-implemented method as described above, wherein the dynamically adjusting the scroll ratio of the scrollbar enables navigation to the initial content and the dynamic content while the scrollbar is selected.

A computer-implemented method as described above, wherein the dynamically adjusting the scroll ratio of the scrollbar further comprises configuring the scrollbar with different scroll ratios for at least one pair of opposing directions.

A computer-implemented method as described above, wherein the dynamically adjusting the scroll ratio of the scrollbar further comprises configuring the scrollbar such that a downwards scroll ratio of the scrollbar is relatively faster than an upwards scroll ratio of the scrollbar.

A computer-implemented method as described above, wherein the dynamically adjusting the scroll ratio of the scrollbar further comprises dynamically increasing a scroll ratio of the scrollbar in a first direction.

A computer-implemented method as described above, wherein the dynamically adjusting the scroll ratio of the scrollbar further comprises dynamically decreasing a scroll ratio of the scrollbar in at least a second direction, the second direction opposite of the first direction.

A computer-implemented method as described above, wherein the dynamically adjusting the scroll ratio of the scrollbar further comprises configuring the scrollbar such that a unit of movement of a thumb of the scrollbar in a first direction changes the content displayed in the user interface at a faster rate than a unit of movement of the thumb of the scrollbar in a second direction opposite the first direction.

A computer-implemented method as described above, wherein the dynamically adjusting the scroll ratio of the scrollbar further comprises determining a linear relationship target position of the scrollbar based on the dynamic content; increasing the scroll ratio of the scrollbar when scrolling away from the linear relationship target position of the scrollbar; and decreasing the scroll ratio of the scrollbar when scrolling towards the linear relationship target position of the scrollbar.

A computer-implemented method as described above, wherein the dynamically adjusting the scroll ratio of the scrollbar further comprises determining a baseline position of the scrollbar; configuring the scrollbar with a first scroll ratio for movement above the baseline position; and configuring the scrollbar with a second scroll ratio for movement below the baseline position, the first scroll ratio and second scroll ratios being different.

A computer-implemented method as described above, further comprising adjusting the baseline position of the scrollbar to a current position of the scrollbar responsive to detecting a pause in movement of the scrollbar.

A computer-implemented method as described above, further comprising increasing the scroll ratio of the scrollbar based on a distance from the baseline position.

A computer-implemented method as described above, wherein the dynamically adjusting the scroll ratio of the scrollbar further comprises dynamically adjusting the scroll ratio of the scrollbar without changing a visual position of the scrollbar.

One or more computer-readable storage media storing processor-executable instructions that, responsive to execution by a processing system of a computing device, implement a scrollbar module configured to perform operations comprising displaying, in a user interface, a portion of initial content and a scrollbar configured for selection to navigate to other portions of the initial content; and responsive to detecting dynamic content for display in the user interface, activating a dynamic scroll mode for the scrollbar which enables navigation to the dynamic content via the scrollbar, without changing a visual position of the scrollbar.

One or more computer-readable storage as described above, wherein the scrollbar module is further configured to perform operations comprising altering a visual appearance of the scrollbar to indicate that the dynamic scroll mode is active.

One or more computer-readable storage as described above, wherein the dynamic scroll mode dynamically adjusts a scroll ratio of the scrollbar, the scroll ratio comprising a ratio of relative movement of content through the user interface to relative movement of the scrollbar.

One or more computer-readable storage as described above, wherein the scrollbar module is configured to activate the dynamic scroll mode while the scrollbar is selected.

One or more computer-readable storage as described above, wherein the scrollbar module is configured to activate the dynamic scroll mode while the scrollbar is selected, without visually changing the portion of initial content currently displayed in the user interface.

A system comprising a processing system; one or more computer-readable media storing processor-executable instructions that, responsive to execution by the processing system, perform operations comprising detecting dynamic content for display in a scrollbar user interface; and configuring a scrollbar displayed in the scrollbar user interface with different scroll ratios for at least two different directions or regions of the scrollbar.

A system as described above, wherein configuring the scrollbar further comprises configuring the scrollbar displayed in the scrollbar user interface with different scroll ratios for scrolling towards a linear relationship target position and for scrolling away from a linear relationship target position.

A system as described above, wherein configuring the scrollbar further comprises configuring the scrollbar displayed in the scrollbar user interface with different scroll ratios for scrolling in a first region of the scrollbar above a baseline position of the scrollbar and in a second region of the scrollbar below the baseline position of the scrollbar.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A computer-implemented method comprising:
   displaying, in a user interface, a portion of initial content and a scrollbar configured for selection to navigate to other portions of the initial content;
   detecting a dynamic modification of the initial content, the dynamic modification of the initial content comprising an addition of dynamic content to the initial content, a removal of content from the initial content, or an alteration of the initial content; and
   responsive to detecting the dynamic modification of the initial content, dynamically adjusting a scroll ratio of a scrollbar while the scrollbar is selected based at least in part on the dynamic modification of the initial content.

2. The computer-implemented method of claim 1, wherein the dynamically adjusting the scroll ratio of the scrollbar further comprises configuring the scrollbar such that a unit of movement of the thumb of the scrollbar in a first direction changes the content displayed in the user interface at a faster rate than a unit of movement of the thumb of the scrollbar in a second direction opposite the first direction.

3. The computer-implemented method of claim 1, wherein the dynamically adjusting the scroll ratio of the scrollbar enables navigation to the initial content and the dynamic content while the scrollbar is selected, the dynamic modification of the initial content comprising the addition of the dynamic content to the initial content.

4. The computer-implemented method of claim 1, wherein the dynamically adjusting the scroll ratio of the scrollbar further comprises configuring the scrollbar with different scroll ratios for at least one pair of opposing directions.

5. The computer-implemented method of claim 1, wherein the dynamically adjusting the scroll ratio of the scrollbar further comprises configuring the scrollbar such that a downwards scroll ratio of the scrollbar is relatively faster than an upwards scroll ratio of the scrollbar.

6. The computer-implemented method of claim 1, wherein the dynamically adjusting the scroll ratio of the scrollbar further comprises dynamically increasing a scroll ratio of the scrollbar in a first direction.

7. The computer-implemented method of claim 6, wherein the dynamically adjusting the scroll ratio of the scrollbar further comprises dynamically decreasing a scroll ratio of the scrollbar in at least a second direction, the second direction opposite of the first direction.

8. The computer-implemented method of claim 1, wherein the dynamically adjusting the scroll ratio of the scrollbar further comprises:
   determining a linear relationship target position of the scrollbar based on the dynamic content;
   increasing the scroll ratio of the scrollbar when scrolling away from the linear relationship target position of the scrollbar; and
   decreasing the scroll ratio of the scrollbar when scrolling towards the linear relationship target position of the scrollbar.

9. The computer-implemented method of claim 1, wherein the dynamically adjusting the scroll ratio of the scrollbar further comprises:
   determining a baseline position of the scrollbar;
   configuring the scrollbar with a first scroll ratio for movement above the baseline position; and
   configuring the scrollbar with a second scroll ratio for movement below the baseline position, the first scroll ratio and second scroll ratios being different.

10. The computer-implemented method of claim 9, further comprising adjusting the baseline position of the scrollbar to a current position of the scrollbar responsive to detecting a pause in movement of the scrollbar.

11. The computer-implemented method of claim 9, further comprising increasing the scroll ratio of the scrollbar based on a distance from the baseline position.

12. A computing device comprising:
   a display device; and
   at least a memory and a processor to implement a scrollbar module configured to perform operations comprising:
   displaying, on the display device, a user interface comprising a portion of initial content and a scrollbar configured for selection to navigate to other portions of the initial content;
   detecting an addition of dynamic content for display in the user interface; and
   responsive to detecting the addition of the dynamic content for display in the user interface, activating a dynamic scroll mode for the scrollbar.

13. The computing device of claim 12, wherein the dynamic scroll mode enables navigation to the dynamic content via the scrollbar.

14. The computing device of claim 12, wherein the dynamic scroll mode enables navigation to the dynamic content via a gesture mapped to moving the scrollbar.

15. The computing device of claim 12, wherein the dynamic scroll mode dynamically adjusts a scroll ratio of the scrollbar, the scroll ratio comprising a ratio of relative movement of content through the user interface to relative movement of the scrollbar.

16. The computing device of claim 12, wherein the scrollbar module is configured to activate the dynamic scroll mode while the scrollbar is selected, the scrollbar selection comprising one of touching the scrollbar, pressing a button on an input device, a gesture mapped to moving the scrollbar, or a voice command.

17. The computing device of claim 12, wherein the scrollbar module is configured to activate the dynamic scroll mode while the scrollbar is selected, without visually changing the portion of initial content currently displayed in the user interface.

18. The system of claim 17, wherein configuring the scrollbar further comprises configuring the scrollbar displayed in the scrollbar user interface with different scroll ratios for scrolling towards a linear relationship target position and for scrolling away from a linear relationship target position.

19. The computing device of claim 12, wherein the operations further comprise altering a visual appearance of the scrollbar to indicate the scroll mode is active.

20. A system comprising:
- a processing system;
- one or more computer-readable media storing processor-executable instructions that, responsive to execution by the processing system, perform operations comprising:
    - displaying, in a user interface, a portion of initial content and a scrollbar configured for selection to navigate to other portions of the initial content;
    - detecting a dynamic modification of the initial content, the dynamic modification of the initial content comprising an addition of dynamic content to the initial content, a removal of content from the initial content, or an alteration of the initial content; and
    - configuring the scrollbar with different scroll ratios for at least two different directions or regions of the scrollbar based at least in part on the dynamic modification of the initial content.

* * * * *